US005989728A

United States Patent [19]
Coffey et al.

[11] Patent Number: 5,989,728
[45] Date of Patent: Nov. 23, 1999

[54] THIN FILM MAGNETIC RECORDING MEDIUM HAVING HIGH COERCIVITY

[75] Inventors: Kevin Robert Coffey, San Jose; James Kent Howard, Morgan Hill; Michael Andrew Parker, Fremont, all of Calif.

[73] Assignee: International Business Machines Corporation, Armonk, N.Y.

[21] Appl. No.: 08/662,910

[22] Filed: Jun. 12, 1996

Related U.S. Application Data

[63] Continuation of application No. 08/333,185, Nov. 2, 1994, abandoned.

[51] Int. Cl.$^6$ .................................................. G11B 5/64
[52] U.S. Cl. ...................... 428/611; 428/620; 428/694 T; 428/694 TS; 428/900; 360/113; 204/192.2; 427/130
[58] Field of Search .................................. 428/611, 694 T, 428/694 TS, 900, 620; 360/113; 204/192.2; 427/130

[56] References Cited

U.S. PATENT DOCUMENTS

| | | | |
|---|---|---|---|
| 4,093,453 | 6/1978 | Makino et al. | 75/129 |
| 4,438,066 | 3/1984 | Aboaf et al. | 420/435 |
| 5,062,938 | 11/1991 | Howard | 204/192.2 |
| 5,147,732 | 9/1992 | Shinoishi et al. | 428/668 |
| 5,294,312 | 3/1994 | Chin et al. | 204/192.2 |
| 5,363,794 | 11/1994 | Lairson et al. | 117/7 |

FOREIGN PATENT DOCUMENTS

| | | | |
|---|---|---|---|
| 06224038 | 8/1994 | Japan | H01F 10/14 |

OTHER PUBLICATIONS

A. Cebollada et al "Enhanced Magneto–Optical Kerr Effect in Spontaneously Ordered FePt Alloys: Quantitative Agreement Between Theory and Experiment" Physical Review B vol. 50 No. 5 Aug. 1994 pp. 3419–3422.

Lairson et al "Atomically Layered Structures for Perpendicular Magnetic Information Storage" Mat. Res. Soc. Symp Proc vol. 343 (Publ. Sep. 21, 1994) pp. 359–367.

Lairson et al "Epitaxial Tetragonal PtCo (001) Thin Films with Perpendicular Magnetic Anisotropy", J. Appl Phys. 74(3), Aug. 1, 1993 pp. 1922–1928.

Martin "Crystallographic and Magnetic Properties of Pseudobinary Alloys Based on Cobalt–Platinum", J. Phys F, vol. 5 p. 1031 (1975).

E. S. Murdock et al., "Roadmap for 10 Gbit/in$^2$ Media: Challenges", IEEE Trans. on Magnetics, vol. 28, No. 5, Sep. 1992, pp. 3078–3083.

T. Yogi et al., "Longitudinal Media for 1 Gb/in$^2$ Areal Density", IEEE Trans. on Magnetics, vol. 26, No. 5, Sep. 1990, pp. 2271–2276.

I. L. Sanders et al., "Magnetic and Recording Characteristics of Very Thin Metal–Film Media", IEEE Trans. on Magnetics, vol. 25, No. 5, Sep. 1989, pp. 3869–3871.

V. Tutovan et al., "On the Order–Disorder Phenomena in CoPt Thin Films Deposited by R.F. Sputtering", in *Thin Solid Films*, 103, Jun. 1983, pp. 253–256.

J. A. Aboaf et al., "Magnetic Properties and Structure of Cobalt–Platinum Thin Films", IEEE Trans. on Magnetics, vol. MAG–19, No. 4, Jul. 1983, pp. 1514–1519.

(List continued on next page.)

*Primary Examiner*—Stevan A. Resan
*Attorney, Agent, or Firm*—Merchant & Gould P.C.

[57] ABSTRACT

An alloy of tetragonal polycrystalline structure acts as a thin film magnetic medium. The medium can be for recording or sensing magnetic transitions representative of data and is of a thickness less than about 200 Å, and has a coercivity in excess of about 2000 Oe. The film is in the L1o phase which is suitable for longitudinal recording and can be constituted by an alloy selected from cobalt or iron together with platinum or palladium. The film is formed by sputtering from a target and thereafter annealing the thin film and at a temperature in excess of about 500° C.

29 Claims, 8 Drawing Sheets

OTHER PUBLICATIONS

A. Tsoukatos et al., "Magnetic Hysteresis of CoPt Films", in *Science and Technology of Nanostructured Magnetic Materials*, Plenum Press, New York, 1991, pp. 701–706.

A. Tsoukatos et al., "Thickness Effects on the Magnetic Hysteresis of Equiatomic CoPt Films", Mat. Res. Soc, Symp. Proc., vol. 232, Oct. 1991 Materials Research Society, pp. 289–294.

T. L. Hylton et al., "Properties of epitaxial Ba–hexaferrite thin films on A–, R–, and C–plane oriented sapphire substrates", J. Appl. Phys. 73(10), May 15, 1993, pp. 6257–6259.

T. L. Hylton et al., "Preparation and magnetic properties of epitaxial barium ferrite thin films on sapphire with in–plane, uniaxial anisotropy", Appl. Phys. Lett. 61(7), Aug. 1992, pp. 867–869.

B. D. Cullity, "Introduction to Magnetic Materials", Addison–Wesley Publishing Co., Reading MA, 1972, Ch. 11, pp. 383–441.

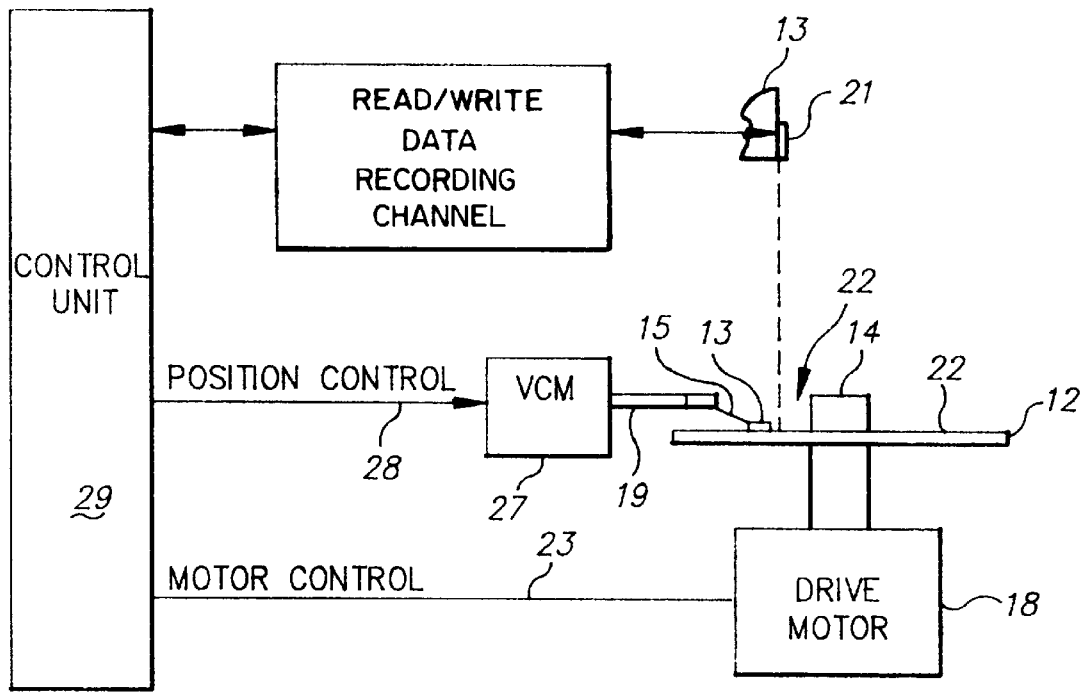
FIG. 1
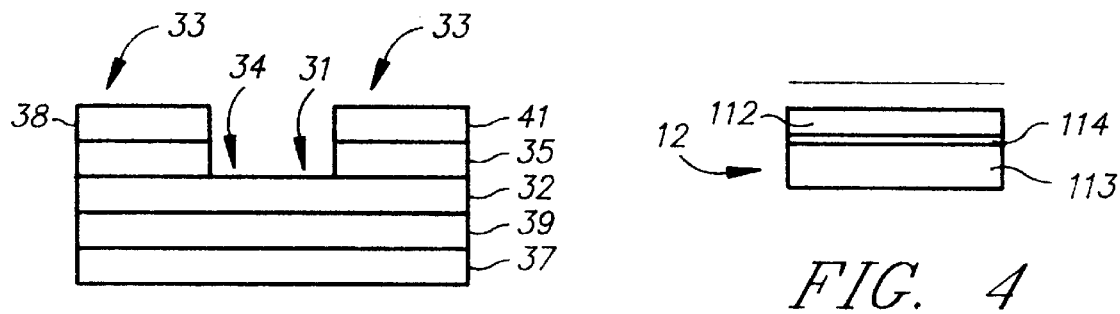
FIG. 2
FIG. 4
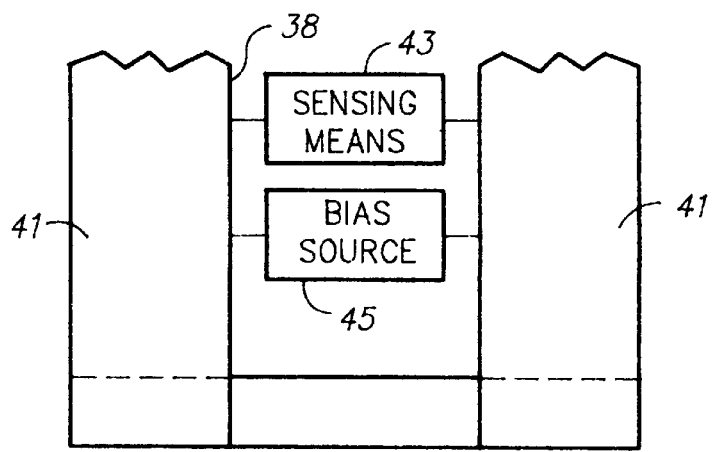
FIG. 3

◯ — Co, Pt, OR Cr ATOM

HEXAGONAL CRYSTAL STRUCTURE

FACE-CENTERED CUBIC:

THIN FILM MAGNETIC RECORDING MEDIUM HAVING HIGH COERCIVITY

This is a Continuation of application Ser. No. 08/333,185, filed Nov. 2, 1994, now abandoned.

BACKGROUND

This invention is directed to a thin film format of magnetic medium which is capable of high density magnetic recording, particularly longitudinal recording. The invention is also directed to having such a medium capable of use in magnetic sensing in a magnetoresistive ("MR") head.

Current art indicates that conventional magnetic recording and sensing mediums, such as cobalt alloy media, for instance, CoPtCr (Cobalt, Platinum, Chrome), are unable to achieve recording densities above 2 to 5 Gbit/in$^2$. An historic trend has been to require reduced magnetic areal moment ("Mrt") and increased coercivity ("Hc") for recording at higher densities. This trend has been extrapolated to theoretical models for 10 Gbit/in$^2$ recording densities. E. S. Murdock, IEEE Trans. Mag. 28, 3078, 1992.

High density recording media also need to consist of exchange decoupled particles. Smaller particles are required at higher densities for reasons of reduced noise, and thereby the ability to obtain a higher signal to noise ratio ("SNR"). Thus, high density recording media requires a reduced Mrt and a reduced particle size. This has been theoretically estimated at 8 to 10 nm for 10 Gbit/in$^2$. E. S. Murdock, IEEE Trans. Mag. 28, 3078, 1992.

Coercivity, Magnetic Moment and Particle Size

Hc, Mrt, and particle size for a 1 Gbit/in$^2$ demonstration and for a theoretical model of a 10 Gbit/in$^2$ requirement are shown in Table I. E. S. Murdock, IEEE Trans. Mag. 28, 3078, 1992; T. Yogi, C. Tsang, T. Nguyan, K. Ju, G. Gorman, and G. Castillo, IEEE Trans. Mag., 26, 2271, 1990.

TABLE I

|  | 1 Gbit Demo | 10 Gbit Case 1 (Theoretical Model) | 10 Gbit Case 3 (Theoretical Model) |
| --- | --- | --- | --- |
| tpi (track density) | 6,350 | 11,000 | 25,000 |
| kbpi (linear density) | 158 | 909 | 400 |
| HC (Oe) | 1800 | 4500 | 2500 |
| Mrt (memu/cm$^2$) | 0.7 | 0.35 | 0.5 |
| Grain size (nm) | 15–20 | 8–10 | 8–10 |

It is not expected that conventional cobalt alloy systems can meet the Hc, Mrt, and particle sizes shown for high density recording in mediums and ranges of greater than 1 Gbit/in$^2$ and particularly approximating about 10 Gbit/in$^2$. In fact, scaling of the 1 Gbit/in$^2$ demonstration to 10 Gbit/in$^2$ suggests an even smaller particle size than that shown, namely as small as 5 to 7 nm, would be needed.

Anisotropy and Superparamagnetism

For all magnetic material systems Hc eventually drops as particle size is reduced due to thermally assisted switching, a phenomena described as superparamagnetism. B. D. Cullity, "Introduction to Magnetic Materials", Addison-Wesley Publishing Co., Reading MA, 1972.

It has not been possible in the prior art to attain all hexagonal phase cobalt alloy systems with a media Hc/Mrt ratio needed to permit for 10 Gbit/in$^2$ densities. I. L. Sanders, T. Yogi, J. K. Howard, S. E. Lambert, G. L. Gorman, and C. Hwang, IEEE Trans. Mag., 25, 3869, 1989. Hc falls off as Mrt is reduced in the 0.4 to 0.6 memu/cm$^2$ range or as grain size or particle size, if exchange decoupled, is reduced.

To achieve a smaller particle size without superparamagnetic effects, a higher crystalline magnetic anisotropy is required. B. D. Cullity, "Introduction to Magnetic Materials", Addison-Wesley Publishing Co., Reading MA, 1972. Table II compares the crystalline anisotropy expressed as the intrinsic coercivity field for coherent rotation of an isolated spherical particle and superparamagnetic particle size limit calculated for a spherical isolated particle for several different magnetic materials.

TABLE II

|  | Hci = 2K/Ms (Oe) | Grain size minimum (nm) |
| --- | --- | --- |
| Co-alloy* | 4,000 | 15.0 |
| Barium Ferrite | 17,000 | 9.7 |
| CoPt | 80,000 | 5.3 |
| SmCo$_5$ | 200,000 | 3.4 |

*Co—19% Cr, T. Weilinga et al, IEEE Trans. Mag., V 18, p 1107, 1982.

The conventional hexagonal phase cobalt alloys are represented by a Co - 19 at. % Cr alloy. Corresponding values for a CoPtCr, CoPtCrB, or CoCrTa alloy can be assumed similar.

Additional alloying elements may increase anisotropy which, acting alone, would reduce the limiting superparamagnetic particle size. This improvement is however mitigated by the moment dilution that occurs with the addition of the alloying elements. Experimental data of hexagonal cobalt alloys do not show suitable Hc/Mrt and particle size.

Table II identifies several alternative materials systems with a theoretical potential to achieve 10 Gbit/in$^2$ requirements.

The L1o Ordered Phase of Magnetic Material

The L1o phase has a tetragonal crystal structure and is related to its disordered FCC solid solution. With a CoPt alloy, for example, there is a layering of the Co and Pt atoms, in alternate planes, along the FCC [001] direction. This direction then becomes the c-axis of the tetragonal L1o.

An L1o ordered phase medium is, for example CoPt, with a compositional range of 45 to 60 atomic percent cobalt. Such a material is known as a high magnetic anisotropy (Hc=4,000 to 5,000 Oe) permanent magnet material. D. J. Craik, Platinum Met. Rev., 16, 129, 1972; A. S. Darling, Platinum Met. Rev. 17, 95, 1963.

The c-axis of the L1o is similar to the c-axis of hexagonal cobalt in that both are the easy axis of magnetization for the crystal. Thus, while the disordered FCC solid solution of Co and Pt has cubic symmetry and low magnetic anisotropy, the ordered L1o phase has uniaxial anisotropy similar to, but greater in magnitude, than hexagonal cobalt.

Thin films of this L1o material have been prepared by previous workers. V. Tutovan, V. Georgescu, and H. Chiriac, Thin Solid Films, 103, 253, 1983; J. A. Aboaf, S. R. Herd, E. Klockholm, IEEE Trans. Mag., 19, 1514, 1983; A. Tsokatos, G. C. Hadjipanayis, C. P. Swann, and S.I. Shah, page 701 in "Science and Technology of Nano-structured Magnetic Materials", Plenum Press, New York N.Y., 1991.

A very high Hc has been reported (max testing field 5,000 Oe) at room temperature. J. A. Aboaf, S. R. Herd, E. Klockholm, IEEE Trans. Mag., 19, 1514, 1983. Films with such materials are still relatively too thick, namely greater than 500 Å, for currently required applications. U.S. Pat. No. 4,438,066 (Aboaf). An Hc of about 10,000 Oe at 10° K has been reported by another group. A. Tsokatos, G. C. Hadjipanayis, C. P. Swann, and S. I. Shah, page 701 in "Science and Technology of Nano-structured Magnetic Materials", Plenum Press, New York N.Y., 1991.

Thin epitaxial films in the range of 100 Å to 500 Å with a coercivity of 4000 to 8000 have been reported. Such films are epitaxial or monocrystalline and thus are not suitable for use as a magnetic recording films, particularly in the longitudinal mode. V. G. Pyn'Ko, L. V. Zhivayeva, N. A. Ekonomov, A. S. Komalov, N. N. Vevtikhiyev and A. R. Krebs, Fiz. metal metalloved., 45, No. 4, 879-881, 1978.

A. Tsoukatos, G. C. Hadjipanayis, Y. J. Zhang, M. Waite and C. P. Swaim, Met. Res. Soc. Symp. Proc. Vol. 232. 1991 Materials Research Society has reported that the magnetic hysterisis of atomic CoPt films is such that as the film decreases in thickness the coercivity reduces.

None of the prior art with regard to CoPt is directed to thin film material suitable for high density recording media. The teachings suggest that as the material becomes thinner the coercivity decreases below a level suitable for high density recording. In particular, as the thickness of polycrystalline L1o material becomes less than 500 Å the coercivity decreases below acceptable levels. Despite the work done on such films, it has not been possible to provide sufficiently thin films suitable for effective use as a high density recording media.

There is a need to provide a sufficiently thin film magnetic medium capable of achieving high recording densities. Such material should ideally have a coercivity sufficiently high to operate with hardware so as to effectively permit recording and sensing of the magnetic signal. The medium should also ideally have a high anisotropy.

More particularly there is a need to provide a thin film medium, preferably less than a few hundred Angstrom, capable of recording in a longitudinal direction and having recording densities at least as high as about 10 Gbit/in$^2$.

SUMMARY

This invention seeks to provide a thin film magnetic material suitable for achieving a high recording density. The invention provides a suitable method of producing a thin film magnetic recording medium. Such a medium provides the correct combination of magnetic characteristics for effective use with compatible recording and sensing technologies.

There is provided a metallic alloy as a thin film suitable for magnetic recording at high densities, and for use in magnetic sensing.

Thin films of such alloy are provided in the L1o ordered phase with a Hc/Mrt value to permit for recording densities in excess of about 10 Gbit/in$^2$.

The present invention provides a polycrystalline L1o phase material, having a surprisingly high room temperature Hc, namely greater than 13,000 Oe. A very large Hc, namely greater than 10,000 Oe is maintained at very low Mrt, having film thicknesses down to 25 Å. Further, an unexpected crystallographic orientation in such a single layer thin film is attained, namely the easy magnetization is at axis 36° above the plane of the film. This orientation is effective for longitudinal recording media.

According to one preferred form of the invention there is provided a CoPt alloy thin film magnetic medium comprising a polycrystalline material being about 45 to about 65 atomic percent cobalt with a thickness less than about 200 Å. There is a tetragonal crystal structure and a coercivity in excess of about 2000 Oe.

Further according to the invention there is provided a process for forming the thin film magnetic medium. This medium which is capable of recording high density magnetic signals, is formed by the steps of sputtering from a target comprising about 45–65 atomic percent cobalt, a thin polycrystalline film of CoPt, having a thickness less than about 200Å. Thereafter the thin film is annealed in a reducing atmosphere of argon and hydrogen at temperatures in excess of about 500° C.

The invention is further directed towards providing a magnetic thin polycrystalline film medium having a primarily L1o phase material. The medium has a coercivity in excess of about 2000 Oe and the thickness of the film is less than about 200 Å.

Such invented medium could be, for instance, FePt, CoPt, or FePd.

For such L1o phase media or alloys there are two types of atom positions. One position is for the larger atoms, for instance Pt, Pd, Au and one position is for the smaller atoms, instance Co, Fe, Cu, Cr. The L1o phase alloys of the invention have a ratio of the number of larger atoms to the number of smaller atoms preferably near 1:1.

Additional L1o compounds are useful for mixing with the L1o compounds to modify the properties of the L1o compounds of the invention. Such additional compounds are CrPt, NiPt, and CuAu. Such additional L1o compounds can control coercivity and reduce processing temperatures.

Further, different elements are useful for mixing with the invented L1o compounds, taking either larger or smaller atom positions. These are, for instance, Au, Cr, Cu, Co, Fe, Ni, Pt, Pd, Mn, Ag, Al. Such elements could effect processing conditions, remanence, and other magnetic properties of the alloy. The preferred process would be either a one step or a two step process. The lowest possible anneal temperature should be employed.

The invention further includes a single layer recording medium on an amorphous substrate, the layer primarily having in-plane magnetocrystalline anisotropy. Different dopants or underlayers can be used for facilitating the in-plane layering of the L1o material thereby to improve the medium for longitudinal recording.

Some underlayer materials are other L1o compounds such as NiMn, CuAu, NiPt, CrPt, and their alloys, oxides materials such as ReO and $ZrO_2$, and elements such as Pt and Pd.

Dopants could be elements Cr, Ta, B, Y, or oxides such as yttria stabilized zirconia (YSZ), $SiO_2$, and $Al_2O_3$ which are used to regulate grain growth and to ensure that the level of coercivity attained by the material is in a range workable with existing technology, for instance between about 2000 Oe and 5000 Oe.

The invention is also directed towards using different dopant materials for achieving an effectively high SNR for the high density recording medium.

Different additives are useful for controlling the crystal microstructure and improving the SNR. These are, for instance, B, P, C, Si, Sn, Ta, Zr, Hf, Y, Ti and Al.

A combination of oxygen with the elements, either directly by deposition from an oxide source, or indirectly by reaction with oxygen present during processing, can be used. Such oxygen assists in promoting small regions of L1o phase material separated by oxides thereby enhancing the properties of the medium.

The invention is also further directed to a layer of a metallic recording medium on a substrate, the metallic recording medium having a hardness greater than about 10 GPa.

The scope of the invention includes magnetic storage systems, magnetic recording media and magnetic sensors having the invented magnetic material.

The invention is further described with reference to the accompanying drawings.

DRAWINGS

FIG. 1 is a simplified block diagram of a magnetic disk storage system embodying the present invention.

FIG. 2 is an end view of a MR transducer assembly.

FIG. 3 is a plan view of the transducer.

FIG. 4 is a cross-sectional partial view of a cross-section of a magnetic storage medium showing a magnetic storage medium on a substrate.

DESCRIPTION

Magnetic Disk Storage System

Figure 5A:
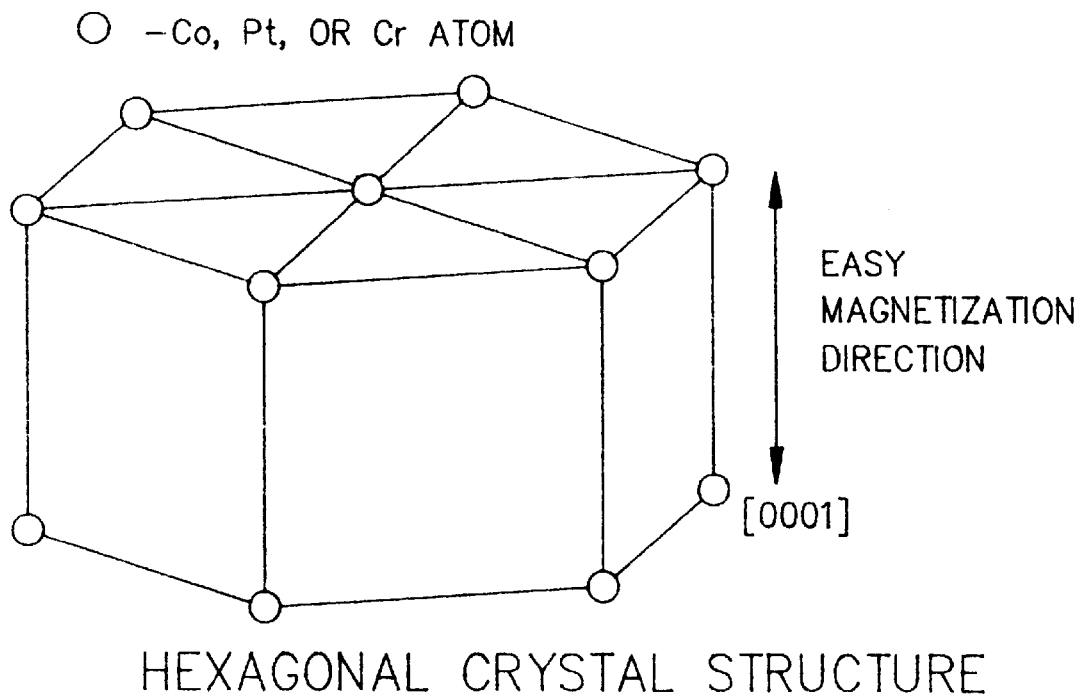
FIG. 5A is a projection of the hexagonal close packed (hcp) crystal structure showing for instance, Co, Pt or Cr atom locations, the element present at each atom positions being essentially randomly determined consistent with overall stiochemistry of the sample.

The invention is described as embodied in a magnetic disk storage-system as shown in FIG. 1. The invention is also applicable to other magnetic recording systems, for example, such as a magnetic tape recording system.

At least one rotatable magnetic disk 12 is supported on a spindle 14 and rotated by a disk drive motor 18. The magnetic recording medium 112 is a uniform film as on each disk. The film is used by a read/write head as an annular pattern of concentric data tracks on disk 12.

At least one slider 13 is positioned on the disk 12, each slider 13 supporting one or more magnetic read/write transducers 21, typically referred to as read/write heads. As the disks rotate, the sliders 13 are moved radially in and out over the disk surface 22 so that the heads 21 may access different portions of the disk where desired data is recorded. Each slider 13 is attached to an actuator arm 19 by means of a suspension 15. The suspension 15 provides a slight spring force which biases the slider 13 against the disk surface 22. Each actuator arm 19 is attached to an actuator means 27. The actuator means as shown in FIG. 1 may be a voice coil motor (VCM), for example. The VCM comprises a coil moveable within a fixed magnetic field, the direction and velocity of the coil movements being controlled by the motor current signals supplied by a controller.

During operation of the disk storage system, the rotation of the disk 12 generates an air bearing between the slider 13 and the disk surface 22 which exerts an upward force or lift on the slider. The air bearing thus counterbalances the slight spring force of the suspension 15 and supports the slider 13 off and slightly above the disk surface by a small, substantially constant spacing during operation.

The various components of the disk storage system are controlled in operation by control signals generated by control unit 29, such as access control signals and internal clock signals. Typically, the control unit 29 comprises logic control circuits, storage means and a microprocessor, for example. The control unit 29 generates control signals to control various system operations such as drive motor control signals on line 23 and head position and seek control signals on line 28. The control signals on line 28 provide the desired current profiles to optimally move and position a selected slider 13 to the desired data track on the associated disk 12. Read and write signals are communicated to and from read/write heads 21 by means of recording channel 25.

The above description of a typical magnetic disk storage system, and the accompanying illustration of FIG. 1 are for representation purposes only. It should be apparent that disk storage systems may contain a large number of disks and actuators, and each actuator may support a number of sliders.

Magnetoresistive Head

A specific embodiment of a magnetoresistive read transducer assembly will be described briefly in conjunction with FIG. 2. The magnetic read head utilizes a magnetoresistive (MR) sensor 31 produced on a suitable substrate (not shown). The MR sensor 31 can be divided into two regions, the central active region 34, where actual sensing of data is accomplished, and end regions 33. The two regions 33, 34 should be biased in different manners with longitudinal bias only in the end regions 33 and transverse bias in the active region 34. The longitudinal bias in the end regions 33 is produced by bias layer 35 which is deposited to be in direct physical contact with MR layer 32. Bias layer 35 may comprise either an antiferromagnetic material or a hard magnetic material. The transverse bias in the active region 34 is produced by a soft magnetic film layer 37 which is separated from the MR layer 32 by a thin nonmagnetic spacer layer 39 whose purpose is to prevent, within the active central region, a magnetic exchange coupling between the MR layer 32 and the soft magnetic bias layer 37. The distance between the inner edges of conductive lead structures 38 and 41 (as shown in FIG. 3) comprise the portion of the active region 34 over which the output signal is sensed.

With reference now to FIG. 3, an output signal $i_s$, can be coupled out to sensing means 43, with the aid of conductive lead structures 38 and 41 which are electrically connected to the MR sensor 31. The signal is enables the sensing means 43 to determine the resistance changes in the active region 34 as a function of the magnetic fields which are intercepted by the MR sensor 31 from previously recorded data on a magnetic medium, for example. A bias source 45 is also connected to conductive lead structures 38 and 41 to supply a bias current which, in conjunction with soft magnetic bias film layer 37, produces the transverse bias in the active regions 34 as is known in the art. Typically, sensing means 43 and bias source 45 may be incorporated in the read/write channel circuitry 25, as shown in FIG. 1.

Crystal Structure

FIG. 5A illustrates a projection of a conventional hcp crystal structure, for instance for a conventional cobalt alloy. The atoms of cobalt, platinum, or chrome could be randomly located in the structure. The easy magnetic direction is illustrated.

Figure 5B:
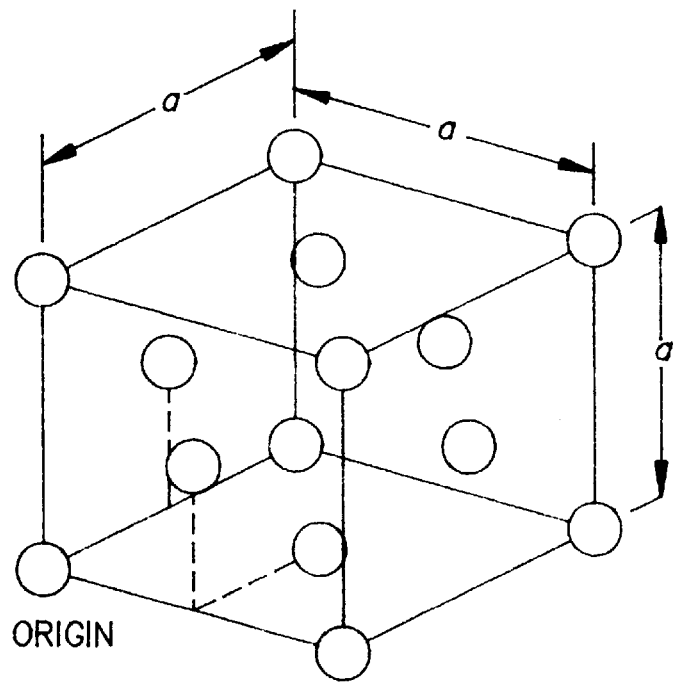
FIG. 5B represents a view of a crystal structure of a FCC phase relationship. The metallic atoms are randomly distributed.

In FIG. 5B there is represented a face-centered cubic (FCC) crystal structure of copper. This would be considered an FCC disordered phase structure if the copper atom positions were occupied randomly by atoms of Co and Pt.

Figure 5C:
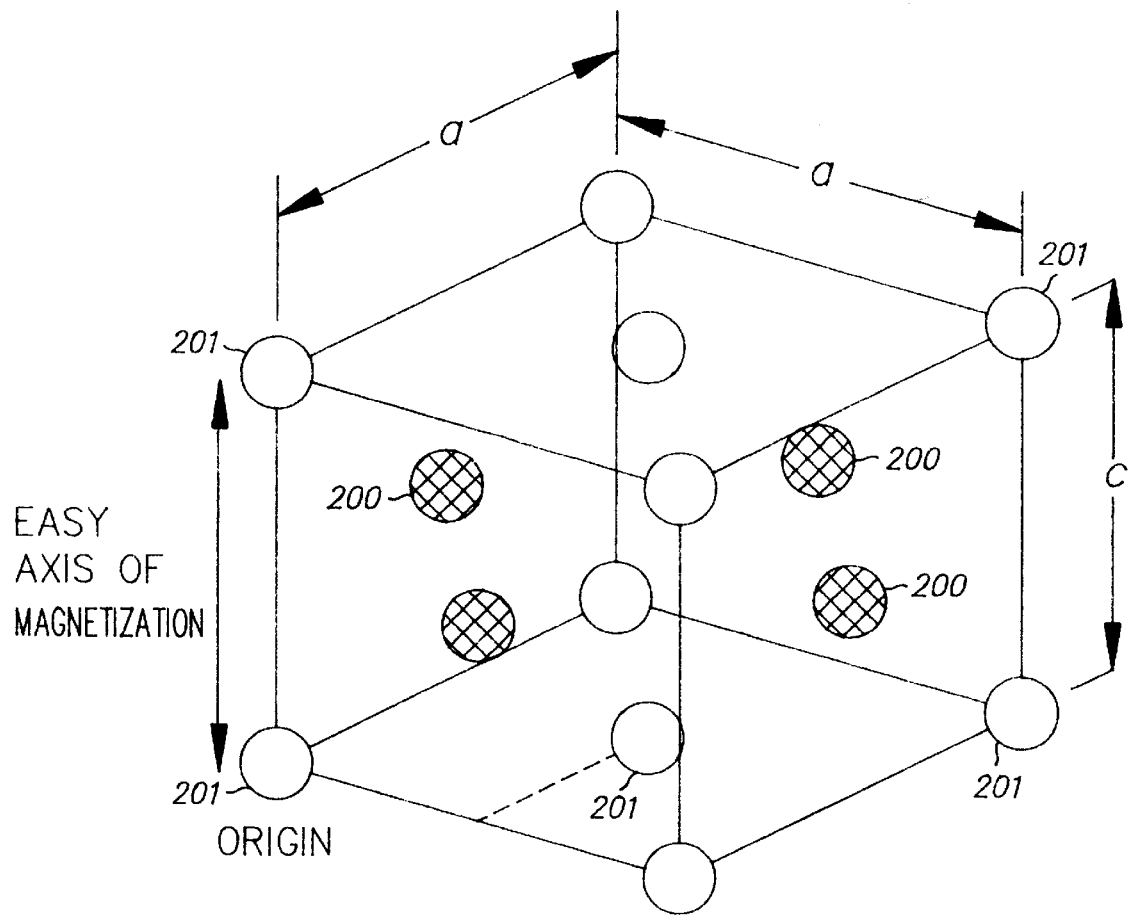
FIG. 5C represents views of a crystal structure of an ordered L1o phase, tetragonal crystal structure, exemplifying the crystalline structure of a medium of the invention.

FIG. 5C illustrates a polycrystalline structure which is of interest in the invention. This structure shows, the L1o phase, a tetragonal crystal structure, and the easy magnetization direction. The cobalt atom 200 in the exemplified structure is located interlayered between layers of platinum atoms 201. There is illustrated a tetragonal lattice of the crystal type AuCu, i.e., L1o phase. This is an illustration of an ordered L1o phase.

Magnetic Recording Medium

A film of magnetic medium 112 is deposited on the substrate 113 forming the disk 12. Optionally there is an underlayer 114 between the disk 12 and the substrate 113. The media should be less than a few hundred Angstrom in thickness, and preferably less than about 200 Å. The medium 112 can be selected from the group of FePt, CoPt, and FePd.

The addition of alloying elements in pairs, one larger size atom/one smaller atom, is likely to have beneficial effects for an ordered phase such as L1o. It is expected that the larger atom added will tend to be located on the Pt atom positions (201 in FIG. 5C) while the smaller atom added will take up the Co atom positions 200 in FIG. 5C). Increased solubility of either alloying element into the L1o phase can result, as the number of large atoms to number of small atoms ratio is thus maintained near 1:1. Pairs of such alloying elements that separately also form L1o crystals, such as CrPt, NiPt, and CuAu are expected to be examples of this, and may have complete mutual solubility with other L1o materials to form a "pseudo-binaries", such as FePt-CrPt.

Different elements are useful for mixing with L1o compounds taking either larger or smaller atom positions. These are, for instance, Cr, Cu, Co, Fe, Ni, Pt, Pd, Au, Mn, Ag, Al. Such elements could effect magnetic properties and processing conditions. For example, the addition of Au and Fe to CoPt can effectively reduce the processing temperature from 700° C. to 500°C. These materials are those intermetallic alloys which are a tetragonal crystalline structure, and more particularly in the L1o phase.

Various dopants, such as Cr, Ta, B, Y, YSZ or $Al_2O_3$ can be added to control coercivity, preferably in the range of about 2000 Oersted to 5000 Oersted.

Different additives are useful for controlling microstructure and probably improving the signal-to-noise ratio. These are, for instance, B, P, C, Si, Sn, Ta, Zr, Hf, Y, Ti and Al and the oxides of these elements, for example, $Zr_2O_3$ and $Al_2O_3$. The combination with oxygen with these elements, either directly by deposition from an oxide source, or indirectly, by reaction with oxygen present during processing, can be used. This promotes the creation of small L1o regions separated by oxides. This enhances the magnetic properties of the medium.

Some underlayer materials are other L1o materials such as NiMn, CuAu, NiPt, CrPt, and their alloys, oxide materials such as ReO and $ZrO_2$, and elements such as Pt and Pd. As such, a longitudinal recording density of about 10 Gbits/in$^2$ with an effective SNR may be attained.

Preparation of Thin Film of Magnetic Material

Thin films of an L1o compound, for instance, CoPt alloy in the composition range of about 1:1 larger atom to smaller atom with one or more additives or dopants are deposited at a temperature suitable for transformation of a primarily L1o ordered phase polycrystalline structure. A high temperature annealing step affects the transformation of a major portion of the sample from an FCC disordered phase as deposited to the primarily L1o ordered phase with high magnetic anisotropy.

Samples were prepared by conventional DC magnetron sputtering, both from alloy targets or co-deposition from elemental sources. The alloy target comprised 45 to 55 atomic percent smaller atom material, for instance cobalt; and the polycrystalline film thickness was established at less than 500 Å, preferably less than about 200 Å, and as thin as 25 Å.

An annealing temperature in the range of about 550° to about 750° was used. A suitable thermally and chemically stable substrate was used. The preferred temperatures are dependent upon composition and for CoPt are greater than about 500° C., and more particularly between about 650° C. and about 700° C. Quartz and Si wafers with a thermal oxide on the surface are suitable. Carbon substrates could also be used.

The annealing treatment used effects the microstructure of the film as well as the volume fraction of the film that has transformed from the disordered FCC to the ordered L1o. Analytical techniques such as x-ray diffraction readily indicate the presence of the primarily L1o phase but do not allow accurate determination of the absence of the FCC phase due to the overlapping of peaks due to the small grain size.

Thus films are defined as having a primarily L1o phase structure when sufficient transformation has occurred to change the magnetic properties without the transformation being complete, in the sense that all disordered FCC phase has disappeared. A primarily L1o phase thin film structure contains L1o phase material but may contain various amounts of disordered FCC, as well.

The annealing is effected for 10 minutes typically, in an atmospheric pressure quartz lamp furnace with flowing Ar/4%$H_2$ gas to prevent oxidation. The composition of the L1o, for instance, CoPt films, can be varied between about 45 to 65 atomic percent cobalt. The results presented are based upon the nominally stoichiometric film samples.

In bulk CoPt permanent magnets, the highest Hc corresponds to a mixture of ordered and disordered phases, and annealing processes are carefully tailored to achieve this mixture. A. S. Darling, Platinum Met. Rev. 17, 95, 1963. For thin films of the present invention, however, Hc typically increases monotonically with annealing time and/temperature, as long as an annealing temperature is less than the equilibrium ordering temperature, (833° C. for CoPt). Annealing above the ordering temperature and rapidly cooling is used to transform an ordered thin film sample back to the FCC disordered phase.

Magnetic Anisotropy for Thin Films

Figure 6:
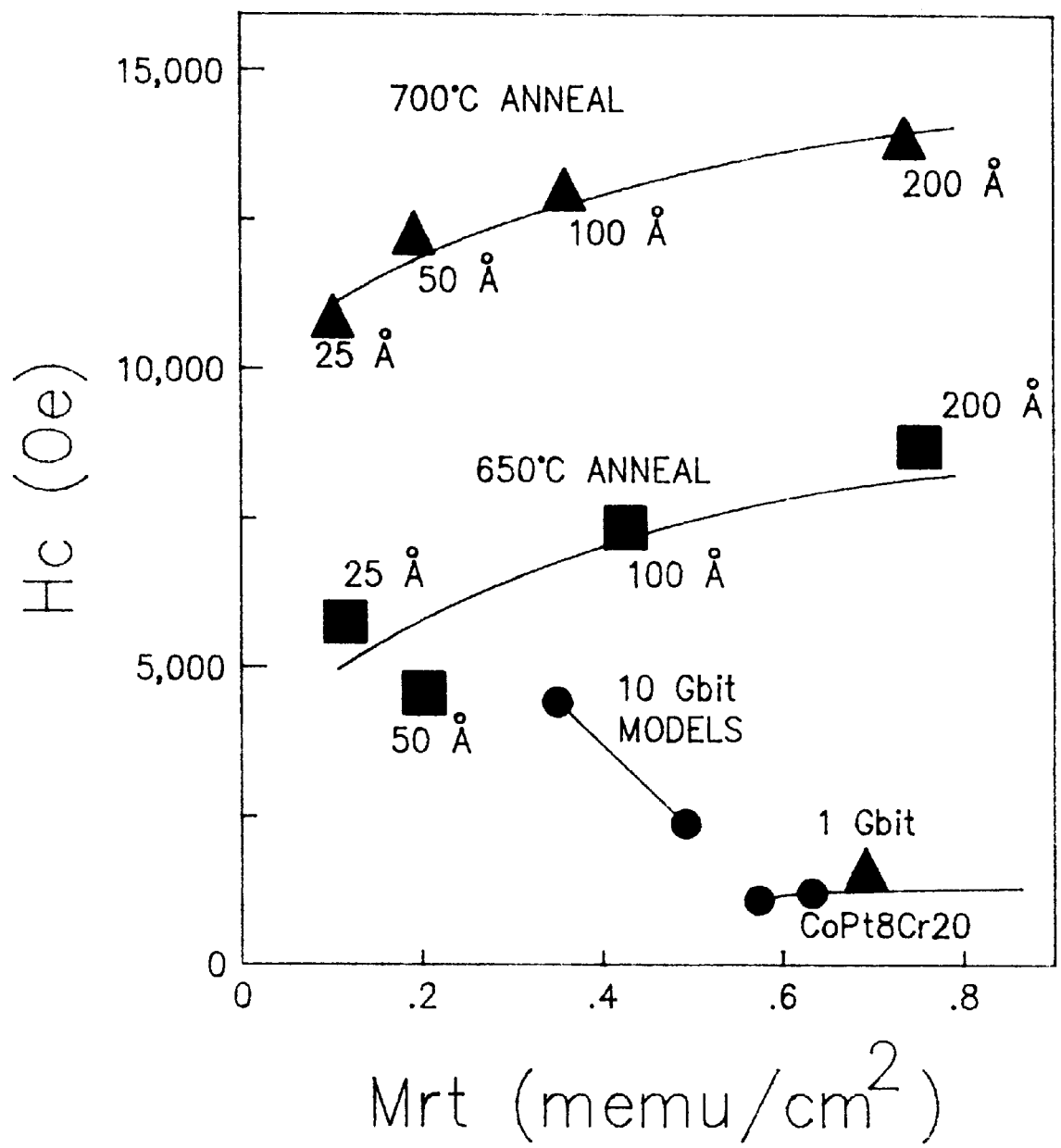
FIG. 6 is a graphical representation showing the coercivity versus thickness for CoPt films at different temperatures relative to prior art materials.

Coercivity versus magnetic remanence-thickness product (Mrt) measured in memu/cm$^2$ for CoPt films annealed for 10 minutes at two different temperatures, namely 700° C. and 650° C. are shown in FIG. 6. Also shown are the values for the 10 Gbit/in$^2$ theoretical models from Table I and a conventional CoPt8Cr20 alloy. The physical thickness of the CoPt films are indicated in FIG. 6 in Å.

The CoPt material system, as an example of a tetragonal crystal, preferably L1o phase metallic media, demonstrates improvements over prior art media in regard to the desirable fundamental properties of magnetic anisotropy, namely high Hc at low Mrt. There are also advantages in relation to mechanical hardness, corrosion resistance, and preferred orientation of the thin film crystallographic, easy-magnetization, axis. This makes metals, such as CoPt, a desirable material system for 10 Gbit/in$^2$ recording.

Figure 7:
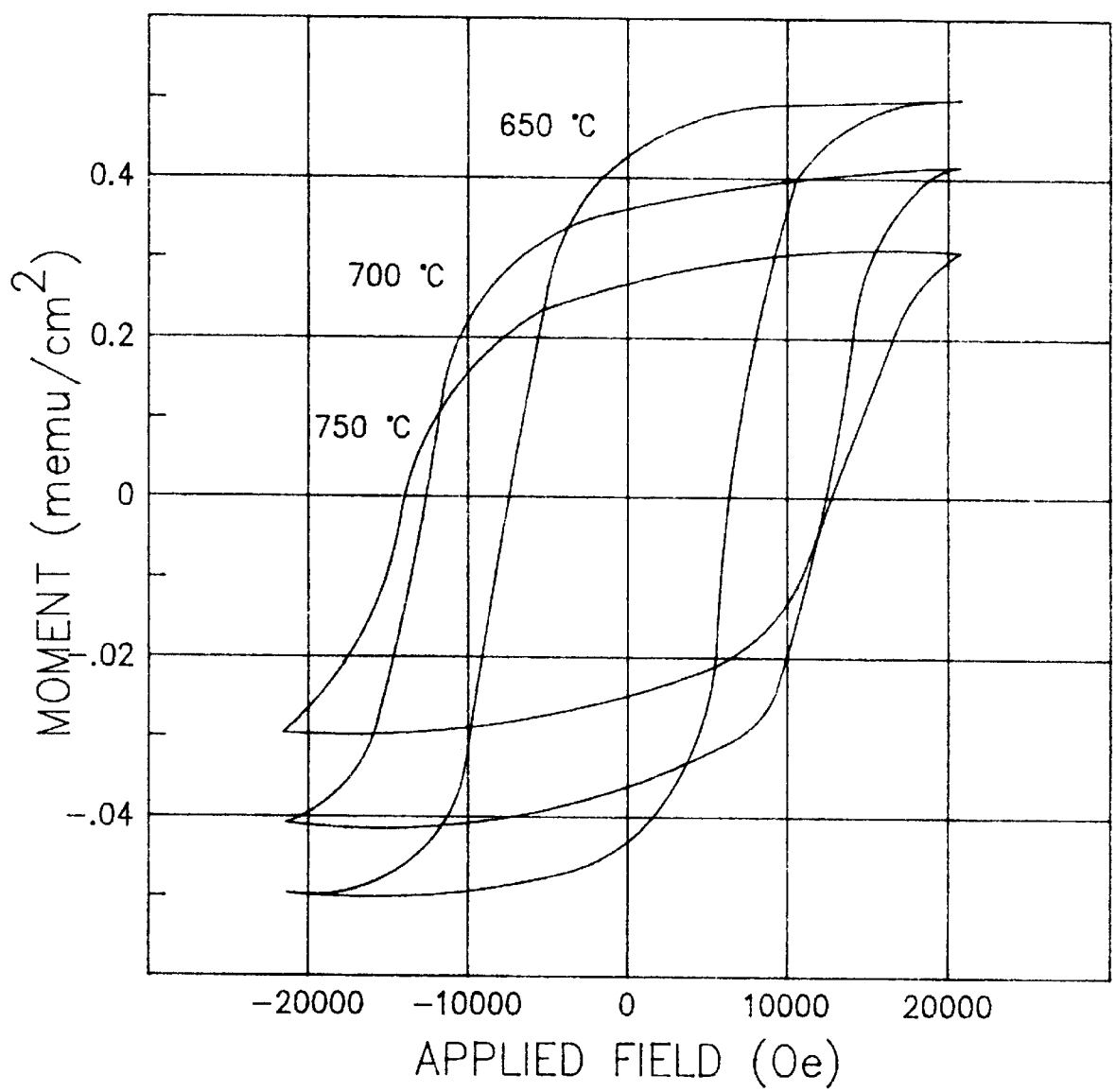
FIG. 7 shows M-H loops measured for 100 Å thick samples.

FIG. 7 shows the M-H loops measured in an Alternating Gradient Magnetometer for the 100Å thin film samples annealed at three different temperatures. The lower Hc (7,460 Oe) loop for the film annealed at 650° C. shows loop closure at high fields, suggesting that the 22,000 Oe field used to measure the loop was sufficient to saturate the sample. Sufficient measuring field for saturation cannot be assumed for the higher Hc (>13,000 Oe) loops of the samples annealed to higher temperatures. The Hc and Mrt values should be considered lower bounds.

The reduction in moment between the 650° C. and 700° C. samples is consistent with an increased volume fraction of ordered phase, as the ordered phase has less moment than the disordered phase. The further reduction in moment observed for the sample annealed at 750° C. is also likely to be due to a minor loop being traced (sample not saturated at 22,000 Oe) based upon the total reduction of moment from the as-deposited sample. Samples similar to these have been annealed to form the ordered phase and then annealed again at a higher temperature, namely above the ordering temperature to transform back to the disordered phase. This verified that these moment changes were reversible and not due to oxidation.

The desired working range to conform with currently used magnetic recording and sensing technology as illustrated, for instance, in the apparatus of FIG. 1 would be a magnetic material with a coercivity of between 2000 and 5000 Oersted. The material in such a working range is exhibited in FIG. 10. It should be noted that a reduction in annealing time or temperature (for temperatures less than the equilibrium order/disorder transition temperature) will result in a reduction of coercivity and that lower coercivity values may usually be obtained in this manner, as well as by compositional changes to the film.

Thin Film Crystallographic Orientation

For hexagonal cobalt alloy media the magnetic easy axis is the c-axis of the hexagonal structure. Single layer hexagonal thin films on amorphous substrates tend to a completely random crystallographic orientation or a (0002) fibre texture, namely the c-axis is normal to film plane. The latter is desirable for perpendicular recording. This is illustrated in FIG. 5A.

For longitudinal recording, underlayers have been required, such as Cr or Cr-V, to achieve an orientation of the cobalt media layer with the c-axis in the plane of the film. The c-axis is fully in the film plane for $(11\bar{2}0)$ and $(1\bar{1}00)$ fibre textures and inclined above the film plane by 28° for a $(10\bar{1}1)$ fibre texture.

Reduced noise and improved SNR have been observed with the latter fibre texture. T. Yogi, T. A. Nguyen, S. E. Lambert, G. L. Gorman and G. Castillo, IEEE Trans. Mag., 26, 1578, 1990; T. Yogi, G. L. Gorman, C. Hwang, M. A. Kakalec, and S. E. Lambert, IEEE Trans. Mag., 24, 2727, 1988. No general relation has been demonstrated between fibre texture and noise properties.

An L1o phase material, such as CoPt is deposited as a disordered FCC phase. FCC metallic thin films tend to orient with a (111) fibre texture. This (111) fibre texture occurs in the as-deposited CoPt thin films. A film with an FCC (111) fibre texture has the [100], [010], and [001] axes at an angle of 36° above the plane of the film.

The ordered L1o phase thin film that results from annealing the disordered FCC structure has a similar crystallographic orientation. This may derive from coherent nucleation of the L1o phase or is possibly due to an independent orientation tendency of the L1o based on surface energy anisotropy. The [001] axis of the L1o phase, which is the c-axis and axis of easy magnetization, is also at 36° above the film plane. Thus, as deposited and annealed, CoPt provides an orientation suitable for longitudinal recording. This is illustrated in FIG. 5C.

Figure 8:
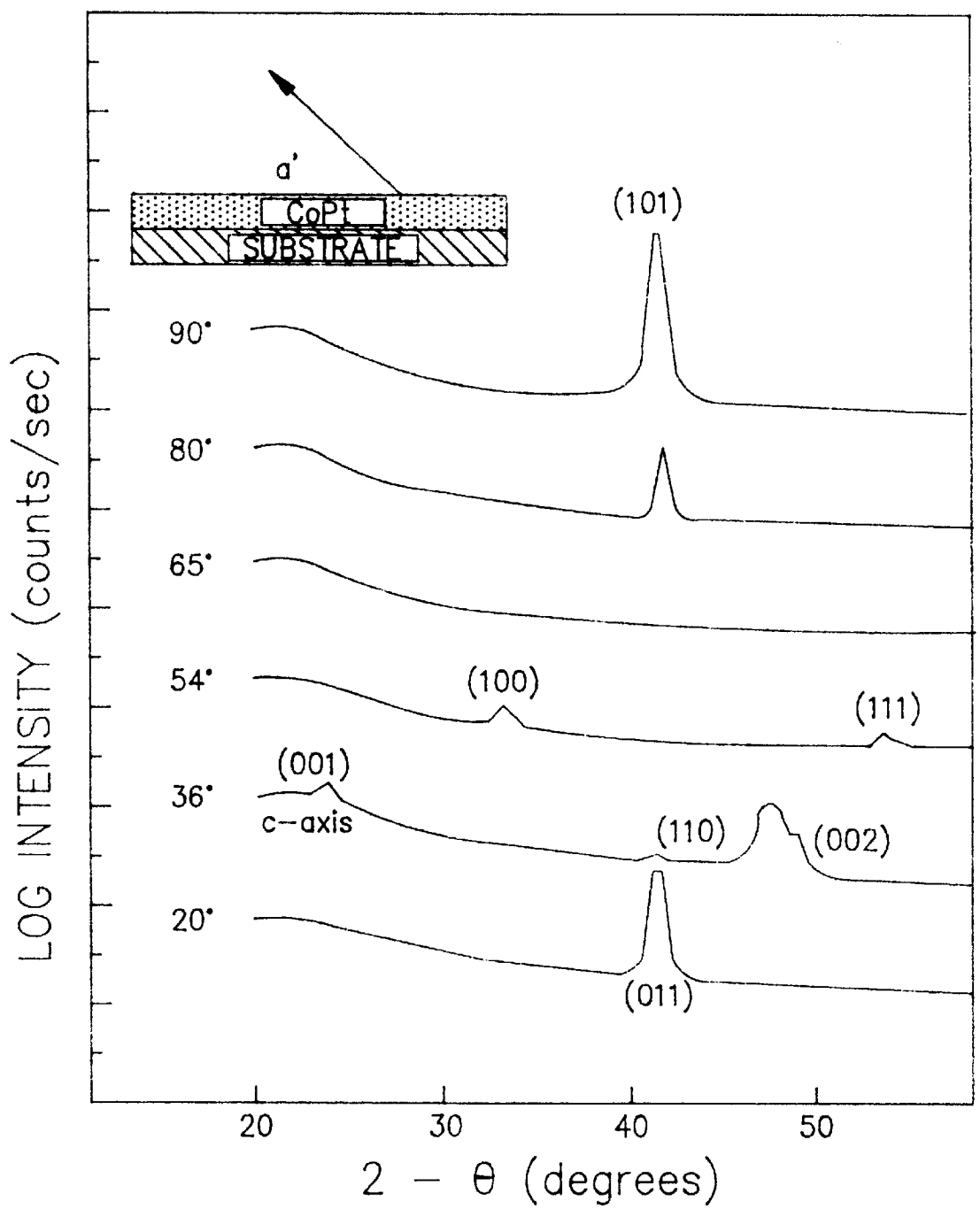
FIG. 8 is a representation in x-ray defraction analysis of a series of coupled θ/2θ diffractometer scans at different sample incidence angles.

The crystallographic orientation of CoPt thin films is shown in the x-ray diffraction analysis of FIG. 8 as a series of coupled θ/2θ diffractometer scans at different sample incidence angles, α'. The vertical scaling is a log intensity, namely major divisions are decades and axis of each plot offset by a decade for clarity. The incidence angle, α', was varied by use of a pole figure attachment.

The uppermost scan, at α'=90°, is equivalent to the most common x-ray powder diffraction scan. The major peak at 2θ equal to 40° identifies the fibre texture of the film as (101). The (101) index is based upon use of the L1o tetragonal phase unit cell, but it should be noted that this is equivalent to the (111) index of the parent, disordered FCC phase. The d-spacing of the L1o (101) and FCC (111) are also similar. This peak may be interpreted as either phase or as a mixture of the two phases. This peak reduces in intensity by a factor of 10 when α' is reduced to 80° and disappears entirely at α' equal to 65°. This indicates a fairly narrow distribution of orientations. At α' equal to 54° the L1o (100) peak is observed. The L1o [100] direction is derived from the FCC [110] direction of the parent phase and thus it is expected at this elevation angle. This d-spacing is not an allowed reflection of the FCC lattice so that the presence of intensity at this angle confirms the existence of the L1o ordered phase in the film. This is also true for the L1o (111) and (001) peaks which are also unique to the L1o ordered phase. The latter is the easy axis and is shown to be present only at 36° above the film plane with an orientation distribution similar to that of the (101) peak.

The FCC (200) peak would be expected at α' equal to 36° also, with a d-spacing similar to the L1o (110) and (002). These are seen to be split due to the tetragonal distortion of the lattice that occurs in addition to the change in symmetry upon ordering. At α' equal to 20° the L1o (011) peak is observed. This peak has the same d-spacing as the L1o (101) but results from a different set of lattice planes. The reduction in intensity between the two peaks is due to the greater solid angle of scattering over which the lower α' peak is distributed.

The 36° inclination of the easy axis is preferred over a random or perpendicular orientation for longitudinal recording media.

Non-Magnetic Properties of the Magnetic Film

Corrosion resistance and mechanical durability are also of interest to magnetic recording media. Table III compares the electrochemical corrosion resistance of the invented L1o material, for instance, CoPt with two conventional hexagonal recording alloy materials.

TABLE III

|  | Corrosion Potential mV vs SCE | Corrosion Current μA/cm² | Current @ 300 mV μA/cm² |
| --- | --- | --- | --- |
| CoPt | +270 | .13 | 4.3 |
| CoPtCr | −325 | .31 | 21 |
| CoNiPt | −100 | .25 | 300–500 |

CoPt is more noble, with a positive corrosion potential of 270 mv, and passivates better, having a 5 times smaller corrosion current when biased 300 mV above its corrosion potential. A CoPt thin film is less likely to be a sacrificial electrode in an electrochemical corrosion process. It will corrode more slowly in response to a more positive potential if present.

The mechanical hardness of the annealed CoPt, measured by nanoindention on 1600 Å films has been compared with similar measurements for other media materials. The hardness of the as-deposited disordered FCC CoPt is about 8 GPa. This is similar to that of the conventional hexagonal phase cobalt alloy. A dramatic increase in hardness occurs with the ordering transformation to the L1o phase. This is a hardness greater than about 10 GPa. This results in a thin film with a hardness similar to that of overcoat materials now in use with magnetic storage medium. It is possible that a thinner overcoat, or no overcoat at all, may be possible with the ordered L1o CoPt magnetic media.

EXAMPLES

Disks have been fabricated using CoPt and tested for SNR performance. A stoichiometric CoPt disordered FCC alloy was sputter deposited on silicon disk substrates with a thickness of about 700 Å surface layer of native oxide. The disks were then annealed to form the ordered phase. The disks were subsequently overcoated with H-carbon, burnished, and lubricated for testing.

The high Hc of the more fully ordered films was beyond the ability of current head hardware technology to write. No attempt was made to examine such films as disk samples.

The disks were prepared by using lower anneal temperatures and times and a series of samples was produced with Hc ranging from 1800 Oe to 6200 Oe. The SNR values ranged from 23 to 29 dB at 3000 fr/mm. The best SNR performance of 29.63 dB was surprisingly observed for the 6200 Oe sample. This sample was not saturated at the maximum write current, as was the case for most of the samples in this series. This sample was annealed at 600° C. for 30 minutes. While not fully transformed, this sample was expected to be more fully transformed than the others in this series.

It is desirable to achieve the small, exchange decoupled grains. TEM analysis of CoPt films indicates that excessive grain growth occurred in these films during the anneal. Plan view TEM with SAD of the as-deposited film shows a desirable 5 nm grain size. Samples of film of a 100 Å thickness annealed at 600° C. show the following trend:

- 10 min.—200 Å average width grains, mostly FCC, very little L1o
- 20 min.—300 Å average width grains, mostly FCC, some L1o
- 40 min.—350 Å average width grains, about equal fraction FCC and L1o Comparison of the TEM results with the SNR testing suggests that poorer SNR results are associated with the large inhomogeneity of the partially transformed film. The film which was mostly transformed, namely about 50%, had the best SNR. TEM verified that the ordering transformation occurred discontinuously, namely grain by grain, rather than gradually to all grains at once. The partially transformed films have a reduced Hc, rather than dual loops of mixed hard and soft material. The ordered phase grains appeared to be exchange coupled to the surrounding FCC grains, and they switched together at a reduced field.

Transmission electron micrographs of a sample annealed to 700° C. for 10 minutes demonstrates a small grain size (≈50 Å) for a film having high coercivity (Hc=2500 Oe). The sample consists of 100 Åthick film of CoPt mixed (by codeposition) with 24 Å of an oxide of zirconium (yttria stabilized zirconia). The oxide addition reduced the grain size in the annealed film.

Some of the same processes that are applied to hexagonal cobalt alloy media are required to control grain growth and provide exchange decoupling in L1o material such as CoPt media. Additions are provided to reduce grain growth and to exchange decouple adjacent grains. Films with Cr, Ta, B, Y, $Al_2O_3$, and yttria dopants have been deposited to reduce grain growth and ensure said film in an effectively operative coercivity range. Laminated thin film structures of CoPt and also $Al_2O_3$ or yttria have been prepared. Different underlayers and overcoats are possible. The reduction of the grain size of the ordered film and the reduction of Hc to levels $\leq 5,000$ Oe should result in media suitable for existing technology.

Reduction of Hc to the requisite range can additionally or separately be achieved by alloying elements that are substitutional in the L1o phase. This should reduce the crystalline anisotropy of the material. Anti-site disorder (Co on Pt sites), Fe and Ni replacement on Co sites, and substitutional replacement on Pt and Co sites are possible. This allows for a possible reduction in the processing temperature, by substitution of a lower melting element, such as Pd, Au or Ag for Pt. It is easier to lose Hc (in CoPt) than it is to gain Hc (in CoPtCr).

A manufacturing process for a L1o material such as CoPt media would preferably be a single step process, where the ordered phase is formed by deposition at an elevated substrate temperature. The substrate temperature required is likely to be significantly less than the temperature required for a two step process, since surface mobility is higher than bulk mobility. A suitable alloy composition can be processed based on the two step process or a single process. High density carbon substrates, quartz or glass substrates are possible.

Figure 9:
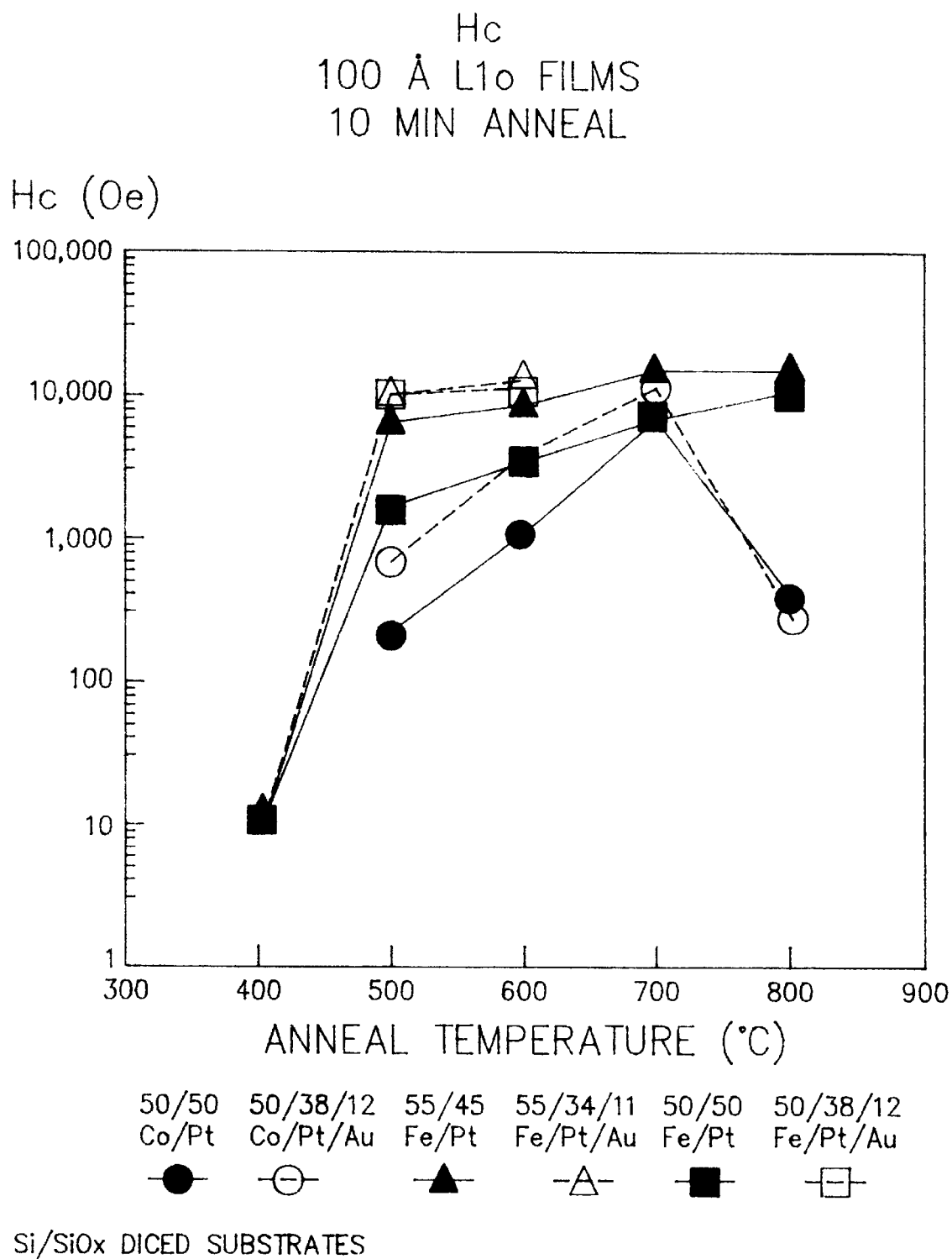
FIG. 9 is a representation of different compounds in a 100 Å L1o film at different anneal temperatures plotted against coercivity.

In FIG. 9 there is illustrated a representation of different coercivities in relation to different annealing temperatures. The films represented in the data of FIG. 9 are as follows:

| Medium | Co/Pt | Co/Pt/Au | Fe/Pt | Fe/Pt/Au | Fe/Pt | Fe/Pt/Au |
|---|---|---|---|---|---|---|
| % Composition | 50/50 | 50/38/12 | 55/45 | 55/34/11 | 50/50 | 50/38/12 |

The films represented are 100 Angstrom L1o films and annealing was for 10 minutes at different temperatures.

Figure 10:
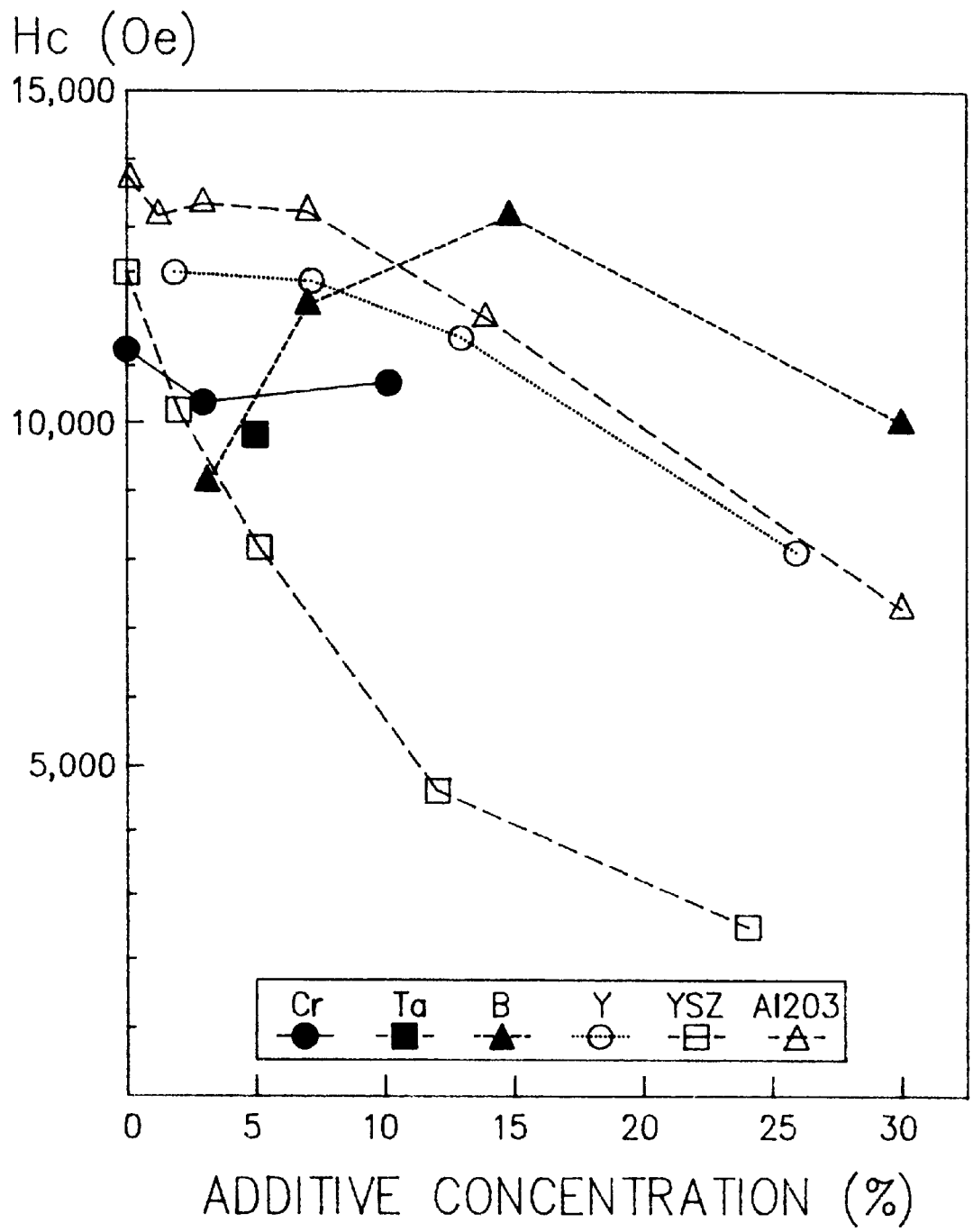
FIG. 10 is a representation of a CoPt 100Å film having different additives in varying amounts of thickness in relation to coercivity.

As illustrated in FIG. 10 there is shown the relationship of coercivity in relation to elements added to CoPt medium.

The film is 100 Å of CoPt and different amounts of additive elements measured in % of additional thickness is shown. The coercivity is indicated generally to drop as the amount of a different additive is increased. The different additives illustrated are Cr, Ta, B, Y, YSZ, and $Al_2O_3$. Annealing of a film represented in the data of FIG. 9 is effected at 700° C. for 10 minutes.

Uses of the Thin Magnetic Film
  Uses for this material include:
  1) thin film disks as the recording media,
  2) MR Heads as the hard bias layer for the MR sensor.

CoPt develops considerable Hc for very thin layers, and a large component of longitudinally oriented magnetization can be obtained without an underlayer. Using the CoPt L1o phase medium in the current MR head design would likely require higher processing temperatures namely more than about 250° C., than has previously been achieved with other prior art materials.

General
  Many other forms of the invention exist, each differing from the other in matters of detail only.

For instance, the recording medium can include laminated L1o, L1o with underlayers, L1o with soluble additives, or L1o with insoluble additives.

As hardware technology requirements change, for instance, the ability to operate with coercivities higher than 5000 Oe, the deposits forming the film can be varied in nature and quantity so that the desired thin film magnetic medium is obtained having the requisite coercivity.

We claim:

1. A thin film magnetic medium comprising a polycrystalline material having a primarily L1o phase structure, being of a thickness less than about 200 Å and having a coercivity in excess of about 2000 Oe, wherein said thin film is annealed in a reducing atmosphere.

2. A medium as claimed in claim 1 being an alloy selected from the group of FePt, FePd or CoPt.

3. A medium as claimed in claim 2 including at least one further element selected from the group of Au, Ni, Cr, Cu, Co, Fe, Pt, Pd.

4. A medium as claimed in claim 2 including at least one further element selected from the group of Mn, Ag, Al.

5. A medium as claimed in claim 1 including at least one dopant element selected from the group of B, P, C, Si, Sn, Ta, Zr, Hf, Y, Ti and Al or the oxides of these elements.

6. A medium as claimed in claim 1 including an underlayer medium for the thin film magnetic medium, the underlayer medium being at least one of a L1o material, an oxide, Pt, or Pd.

7. A medium as claimed in claim 2 including at least one other compound having a primarily L1o phase structure, the other compound being different than the first L1o phase material.

8. A medium as claimed in claim 1 wherein a hardness of the surface of the medium is greater than about 10 GPa.

9. An alloy thin film magnetic medium selected from the group of CoPt or FePt comprising a polycrystalline material being about 45 to about 65 atomic percent cobalt or iron respectively, having a thickness less than about 200 Å, a tetragonal crystal structure, and a coercivity in excess of about 2000 Oe, wherein said thin film is annealed in a reducing atmosphere.

10. A medium as claimed in claim 9 including at least one further element selected from the group of Au, Ni, Cr, Cu, Co, Fe, Pt, Pd.

11. A medium as claimed in claim 9 including at least one further element selected from the group of Mn, Ag, Al.

12. A medium as claimed in claim 9 including at least one dopant element selected from the group of B, P, C, Si, Sn, Ta, Zr, Hf, Y, Ti and Al or the oxides of these elements.

13. A medium as claimed in claim 9 including an underlayer medium for the thin film magnetic medium, the underlayer medium being at least one of a L1o material, an oxide, Pt, or Pd.

14. A medium as claimed in claim 9 including at least one other compound having a primarily L1o phase structure, the compound being different than CoPt.

15. A medium as claimed in claim 9 wherein a hardness of the surface of the medium is greater than about 10 GPa.

16. A magnetic storage system comprising;
a magnetic storage medium for recording of data, the magnetic storage medium including an alloy thin polycrystalline film selected from the group of CoPt or FePt having about 45 to about 65 atomic percent cobalt or iron respectively, having a thickness less than about 200 Å, a tetragonal crystal structure, and a coercivity in excess of about 2000 Oe, wherein said thin film is annealed in a reducing atmosphere, and
a magnetic transducer maintained in a closely spaced position relative to said magnetic storage medium during relative motion between said magnetic transducer and said magnetic storage medium, said magnetic transducer including a read sensor for reading data by reacting to magnetic changes on the storage medium and including means for writing data on the magnetic storage medium by effecting discrete magnetic changes on the magnetic storage medium.

17. A magnetic storage system comprising:
a magnetic storage medium for recording of data, the magnetic storage medium including a polycrystalling film having a thickness less than about 200 Å, having a primarily L10 phase structure and having a coercivity in excess of about 2000 Oe, wherein said film is annealed in a reducing atmosphere, and
a magnetic transducer maintained in a closely spaced position relative to said magnetic storage medium during relative motion between said magnetic transducer and said magnetic storage medium, said magnetic transducer including a read sensor for reading data by reacting to magnetic changes on the storage medium and including means for writing data on the magnetic storage medium by effecting discrete magnetic changes on the magnetic storage medium.

18. A magnetoresistive read sensor comprising a substrate, and a layer including a magnetic hard layer, the magnetic hard layer having a CoPt alloy polycrystalline material including about 45 to about 65 atomic percent cobalt having a thickness less than about 200 Å, a tetragonal crystal structure, and a coercivity in excess of about 2000 Oe, wherein said polycrystalline material is annealed in a reducing atmosphere.

19. A magnetoresistive read sensor comprising a substrate, and a layer including a magnetic hard layer the magnetic hard layer having a polycrystalline film with a thickness less than about 200Å, a primarily L1o phase structure, and a coercivity in excess of about 2000 Oe, wherein said film is annealed in a reducing atmosphere.

20. A process for forming a thin film recording medium comprising the steps of:
sputtering from a target a material to provide a thin polycrystalline film having a primarily L1o phase structure having a thickness less than about 200 Å; and
annealing said thin film in a reducing atmosphere at a temperature in excess of about 500° C., thereby to provide a coercivity in excess of about 2000 Oe for the film.

21. A process as claimed in claim 20 wherein the material for the film is an alloy consisting of an element selected from the group of FePt, FePd or CoPt.

22. A process as claimed in claim 21 wherein the material includes a further element selected from the group Au, Ni, Cr, Cu, Co, Fe, Pt, and Pd.

23. A process as claimed in claim 20 including adding at least one dopant selected from the group of B, P, C, Si, Sn, Ta, Zr, Hf, Y, Ti, and Al or the oxides of these elements.

24. A process for forming a thin film recording medium comprising the steps of:
sputtering from a CoPt or FePt target including about 45 to 65 atomic percent cobalt or iron respectively, a polycrystalline thin film of primarily L1o phase having a thickness less than 200 Å; and
annealing said thin film in a reducing atmosphere at a temperature in excess of about 500° C.

25. A process as claimed in claim 24 wherein the material includes an element selected from the group Au, Ni, Cr, Cu, Co, Fe, Pt, and Pd.

26. A process as claimed in claim 24 including adding at least one dopant selected from the group of B, P, C, Si, Sn, Ta, Zr, Hf, Y, Ti, and Al or the oxides of these elements.

27. A process as claimed in claim 25 including adding at least one dopant selected from the group of B, P, C, Si, Sn, Ta, Zr, Hf, Y, Ti, and Al or the oxides of these elements.

28. A process for forming a thin film recording medium comprising the steps of:

sputtering from a target a material to provide a thin polycrystalline film having a primarily L1o phase structure having a thickness less than about 200 Å; and annealing said thin film in a reducing atmosphere including argon and hydrogen at a temperature in excess of about 500° C., thereby to provide a coercivity in excess of about 2000 Oe for the film.

29. A process for forming a thin film recording medium comprising the steps of:

sputtering from a target including about 45 to 65 atomic percent cobalt, a polycrystalline thin film of primarily L1o phase having a thickness less than about 200 Å; and annealing said thin film in a reducing atmosphere including argon and hydrogen at a temperature in excess of about 500° C.

* * * * *